(12) United States Patent (10) Patent No.: US 12,602,353 B2
Gordon et al. (45) Date of Patent: Apr. 14, 2026

(54) HASH BASED FILTER

(71) Applicant: VAST DATA LTD., Tel Aviv (IL)

(72) Inventors: Eyal Gordon, Tel Aviv (IL); Asaf Levy, Tel Aviv (IL)

(73) Assignee: Vast Data Ltd., Tel Aviv (IL)

( * ) Notice: Subject to any disclaimer, the term of this patent is extended or adjusted under 35 U.S.C. 154(b) by 252 days.

(21) Appl. No.: 17/445,193

(22) Filed: Aug. 16, 2021

(65) Prior Publication Data

US 2023/0049428 A1 Feb. 16, 2023

(51) Int. Cl.
*G06F 16/00* (2019.01)
*G06F 16/13* (2019.01)
*G06F 16/14* (2019.01)

(52) U.S. Cl.
CPC .......... *G06F 16/137* (2019.01); *G06F 16/148* (2019.01); *G06F 16/156* (2019.01)

(58) Field of Classification Search
CPC ..... G06F 16/137; G06F 16/148; G06F 16/156
USPC ......................................................... 707/747
See application file for complete search history.

(56) References Cited

U.S. PATENT DOCUMENTS

| | | | | |
|---|---|---|---|---|
| 2010/0268799 A1* | 10/2010 | Maestas | .............. | H04L 61/5061 |
| | | | | 709/220 |
| 2015/0007319 A1* | 1/2015 | Antonov | ................. | G06F 21/56 |
| | | | | 726/23 |
| 2016/0253425 A1* | 9/2016 | Stoops | ................ | G06F 16/2255 |
| | | | | 707/754 |
| 2016/0350302 A1* | 12/2016 | Lakshman | .......... | G06F 16/9014 |
| 2020/0034063 A1* | 1/2020 | Somasundaram | .. | G06F 9/45558 |
| | | | | 707/707 |

* cited by examiner

*Primary Examiner* — Alexandria Y Bromell
(74) *Attorney, Agent, or Firm* — Reches Patents

(57) ABSTRACT

A method for cluster based searching for a value range stored in a storage system, the method may include receiving a request to find a certain value range within a set of information elements that are stored in a storage system; wherein the set of information elements comprises subsets of information elements associated with subset hash based filters; wherein different subsets of information elements are associated with different subset hash based filters; determining a certain cluster value of a certain cluster that comprises the certain value range; applying one or more hush functions on the certain cluster value to provide one or more hash results; and determining whether one or more members of the certain cluster are possibly in a subset of information elements, based on the one or more hash results and on a subset hash based filter of the subset of information elements; and when determining that the one or more members of the certain cluster are possibly in the subset then searching, within the subset, a matching information element that matches the certain value range.

18 Claims, 6 Drawing Sheets

Hash_result1 = Hash_function_1(first cluster value) –
belongs to bins 180(1,1))

Hash_result2 = Hash_function_2(first cluster value) –
belongs to bins 182(1,5))

Hash_result3 = Hash_function_3(first cluster value) –
belongs to bins 180(1,n-1)

First Bloom filter 180(1)
(of first group 150(1))

Value range 171

Cluster value mapping data structure 185

Cluster value 172

Hash functions 186

Hash results 173

Search for set bits corresponding to relevant bins of bloom filters – one relevant bit per hash result First till N'th bloom filters
180(1)- 180(N)

First search results  174(1)- 174(N)

Search for matching fields in relevant groups (if such exist) 187

Second search results  175

170

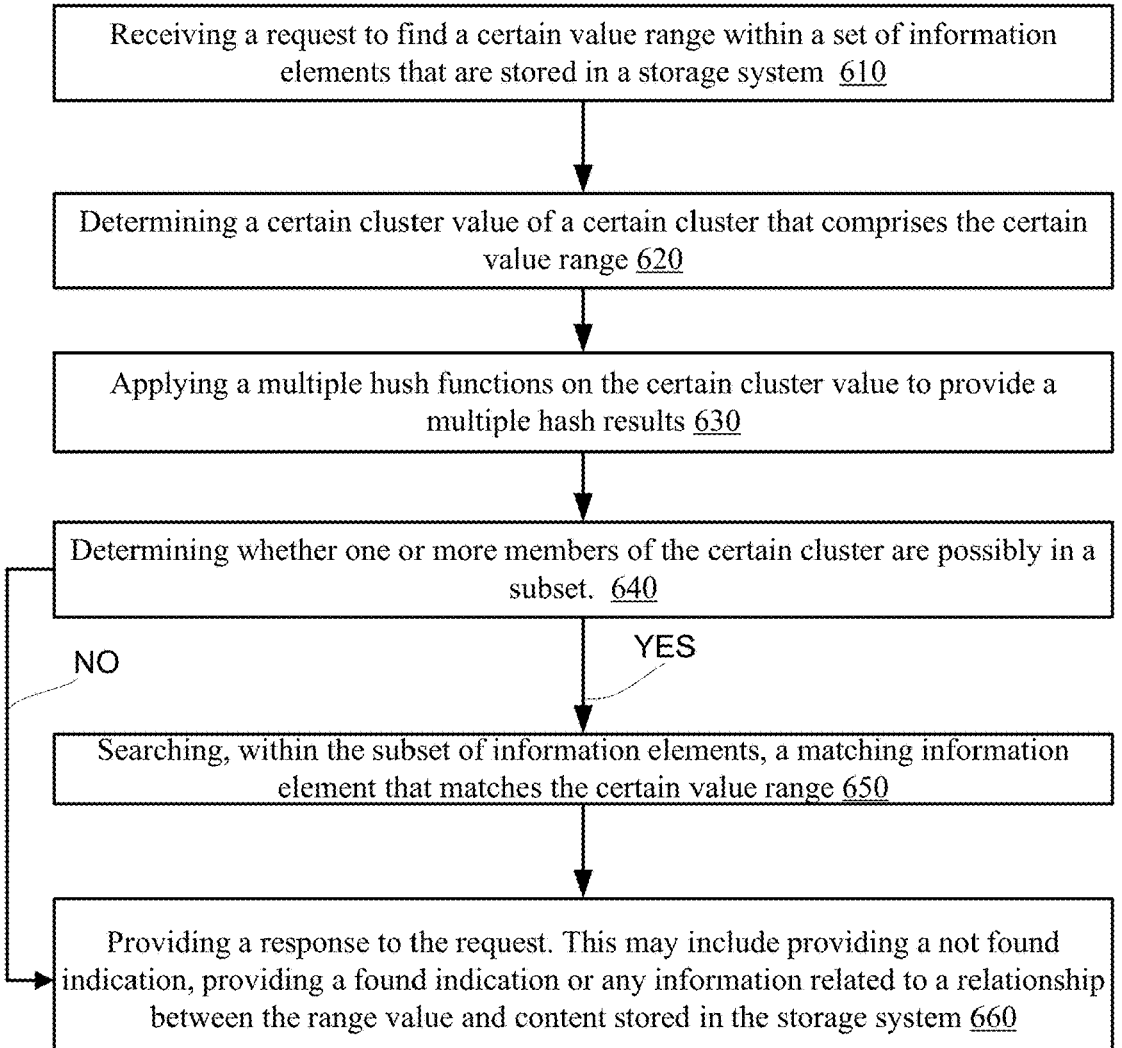

Receiving a request to find a certain value range within a set of information elements that are stored in a storage system 610

Determining a certain cluster value of a certain cluster that comprises the certain value range 620

Applying a multiple hush functions on the certain cluster value to provide a multiple hash results 630

Determining whether one or more members of the certain cluster are possibly in a subset. 640

NO

YES

Searching, within the subset of information elements, a matching information element that matches the certain value range 650

Providing a response to the request. This may include providing a not found indication, providing a found indication or any information related to a relationship between the range value and content stored in the storage system 660

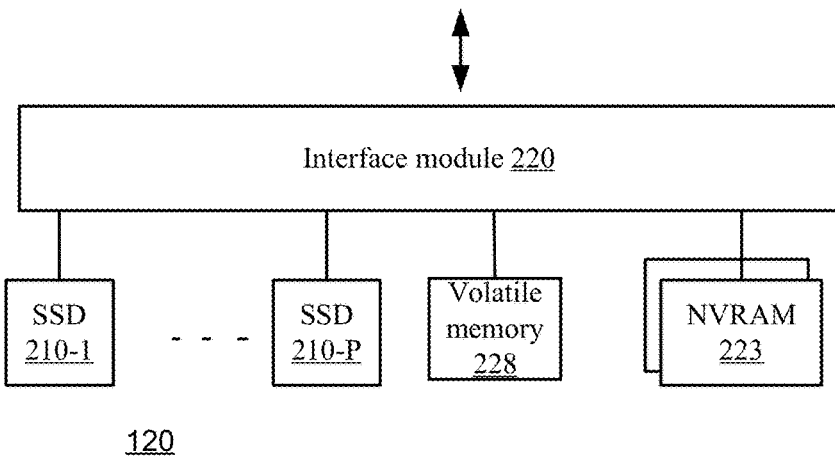
120
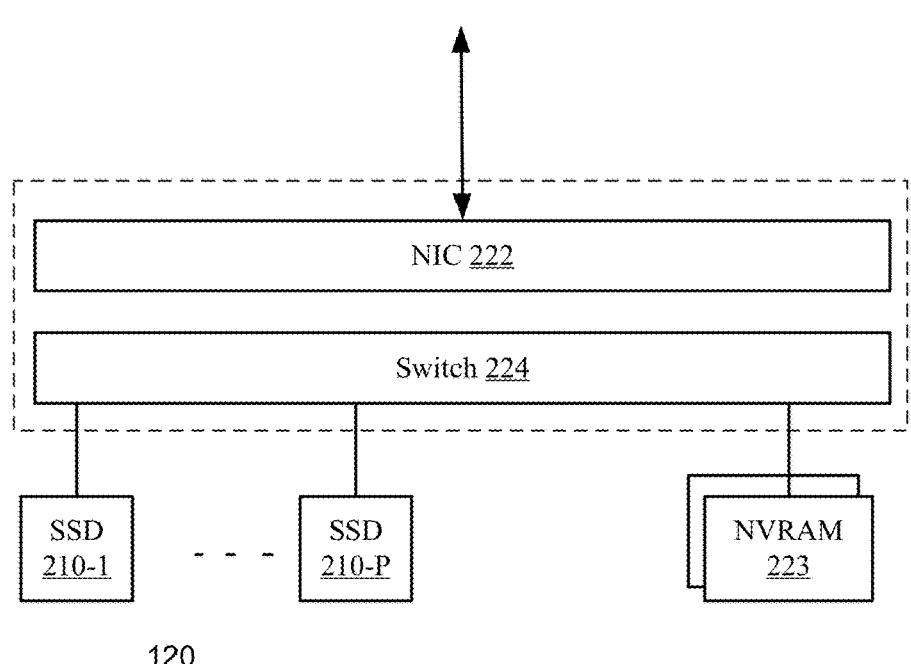
120
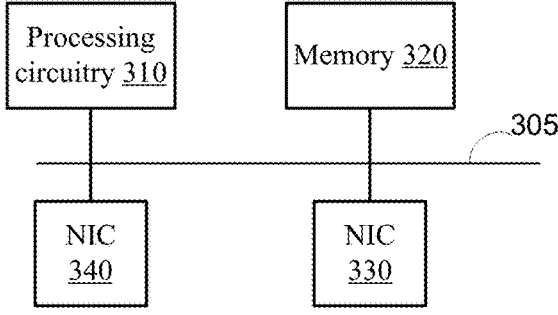
FIG. 6

HASH BASED FILTER

TECHNICAL FIELD

The present disclosure generally relates to the field of data storage, and more particularly to a hash based filter for clustered fields.

BACKGROUND

A Bloom filter is a space-efficient data structure, for testing whether an element is a member of a set. The Bloom filter can be used for determining that an element is not part of the set, since false positive matches are possible, while false negatives cannot occur.

A traditional Bloom filter is a bit array of m bits, initially set to 0, that is associated with k different hash functions, where each hash function produces a hash value that uniformly maps an element to one of the m bits. The k hash values for a given element maps the element to k entries that are all set to 1 for the given element. The relation between the numbers k and m dictates the desired false error rate, since multiple elements can produce the same hash value.

When querying an element, the k hash functions are applied on the element, and if at least one bit corresponding to one of the hash results is not set—then it can be determined that the element is definitely not part of the set. If all the bits corresponding to all the hash results are set—it means that the element is possibly in the set, but there is still a need to scan the set to verify that the element is indeed part of the set.

Bloom filter is being used for stored data sets, such as databases, where for a given group of fields that is part of a column, query acceleration can be done by using metadata on the values in that group. One such metadata type is a bloom filter for all the field values of the column in the group.

Queries for specific values first check if they are in the bloom filter. When checking if a value is in the bloom filter, if the result is "no", it's definitely not in the row group, and if the result is "yes" (there is a possibility that it is in the row group) it may be a false positive that requires scanning of the values in the column.

To improve false positive ratio, the number of entries m in the bloom filter should be increased.

There is a need to improve the false positive ratio while maintaining a small size of the filter.

SUMMARY

There may be provide a storage system, a method and a non-transitory computer readable medium for database table filter for clustered fields.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 4 illustrates an example of a method; and

FIGS. 5 and 6 are an example of storage systems.

DETAILED DESCRIPTION

Figure 1:
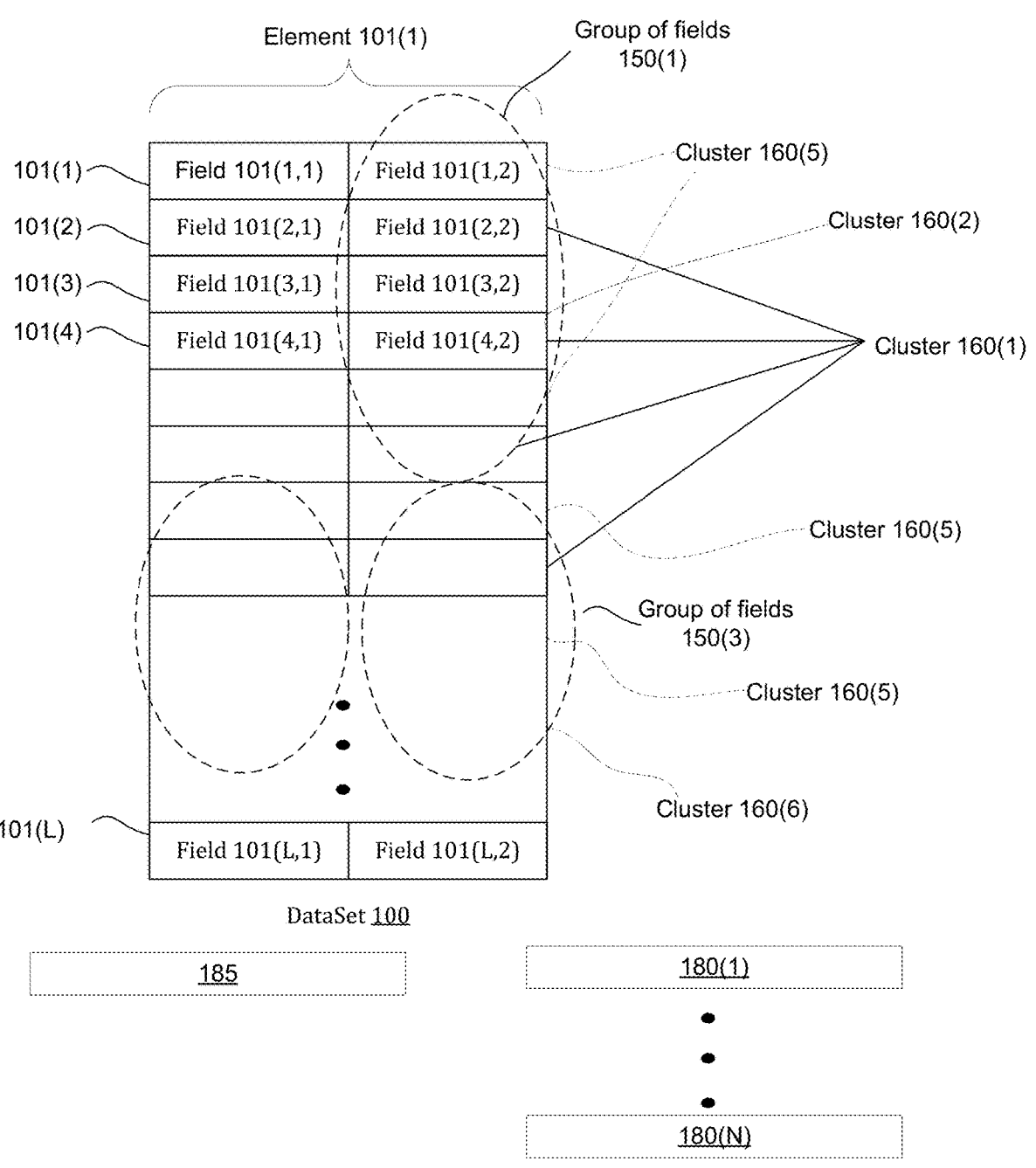
FIG. 1 illustrates an example of a dataset.

In the following detailed description, numerous specific details are set forth in order to provide a thorough understanding of the invention.

However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

The term information element may be any field, combination of fields, data unit and the like. It may include data, metadata, instructions and the like.

A set of information elements may include multiple information elements, and may refer to a group of fields of a database, a key-value store, or any other dataset. The multiple information elements may be arranged and/or formatted in any manner. The set may include one or more subsets of information elements. The subsets of information elements may have the same number of information elements or may differ from each other by the number of information elements. There may be any difference between two or more subsets of information elements—for example aggregate size, format, arrangement, origin of information elements, and the like.

There may be provided a storage system, a method and a non-transitory computer readable medium for using a cluster related as hash based filter.

A hash based filter is a filter that is searched by a process that includes applying one or more hash functions to provide one or more hash results. For simplicity of explanation references are made to multiple hash functions and to multiple hash results. Non limiting example of such filters include a bloom filter, a cuckoo filter and the like. For simplicity of explanation the following text may refer to a bloom filter but may be applied mutatis mutandis on other hash based filters.

The system, non-transitory computer readable medium and method of the application use filters for stored data sets, such as various columns of a database or key-value stores, for determining whether a requested field is included in a group of fields. However, instead of representing all the values of all the fields in the filter, the proposed filter includes presentations of clusters of values rather than presentation of all the values included in a group of fields.

The term group of fields may refer to a subset of the fields, since fields may be grouped, where each group is assigned with its own filter. An example of a group of fields may be a portion of a column in a database. The fields may be grouped in a random manner or in a manner that optimizes the usage of the filters.

In order to determine whether a field, requested by a query, conforms to the query—the filter is tested for the existence of the cluster to which the field belongs.

Since the number of clusters is much lower than the number of field values, the size of the filter can be reduced, comparing to the traditional Bloom filter (used for e.g., tabular databases), where the number of bits m in the traditional Bloom filter can be calculated by the formula: $m=\text{ceil}((n^*\log(p))/\log(1/\text{pow}(2, \log(2))))$, where n—is the number of elements and p—the desired probability for false positive results. According to embodiments of the application, the number of entries in the filter can be calculated by changing the value n with the value f, the number of clusters, which is much lower than n.

In addition, the false positive rate can be reduced, comparing to the traditional Bloom filter, since the filter needs to support less values. The probability for a false negative result in the traditional Bloom filter is calculated according to the formula:
$p=\text{pow}(1-\exp(-k/(m/n)), k)$—where k is the number of hash formulas, n is the number of elements and m is the number of entries in the filter. According to embodiments of the application, since the number of elements to be fed to the filter is replaced with the number of clusters f, then if the filter size m remains the same as the size of a filter that serves n values, then the false negative ratio is improved, where the value of n in the formula is replaced by the number of clusters f. Any filter having a size between a size required for supporting n values and a size for supporting f values—provides both efficient space utilization and improved false negative ratio.

Fields in a group of the dataset (e.g., a portion of a column of a database table) are clustered according to their values. N distinct fields may be clustered into F clusters.

A clustering algorithm may be applied for forming the clusters, when the dataset is populated with at least a certain amount of data or fields. The clustering algorithm may include, for example k-means clustering. Alternatively, the clusters can be formed before the dataset is being populated, by using various ranges and sub-ranges definitions, splitting field values, concatenation of fields, or a combination of field concatenation and field splitting.

Each cluster is associated with a cluster identifier that may represent the values or ranges of values to be included in the cluster.

For example: (i) if the clustering split the entire value range to sub-ranges, the cluster identifier may be a concatenation of the lower and the upper values of a sub-range of values that belong to the cluster, e.g., if the fields contains zip codes, the clustering may be according to zip code ranges and the cluster identifier of each sub-range may be the lower value of the zip code range concatenated with the upper value, (ii) a cluster identifier may be part of a field value, e.g., first letters of names, (iii) a cluster identifier may be a concatenation of two or more fields or part of fields, e.g., a family name concatenated with the first letter of the first name, etc.

Alternatively, the value of the cluster identifier may not be related to the values of the fields and may be assigned with an independent value.

When adding an element, having one or more fields, to a dataset, the cluster of each field of the element is determined according to the field's value. The hash formulas associated with the filter are applied on the cluster identifier to provide hash values that represent the cluster identifier. The hash values are applied into the filter—by updating the entries corresponding to the hash values.

When querying for a certain field, the cluster of the requested field is determined, and the hash formulas associated with the filter are applied on the cluster identifier to provide hash values that represent the cluster identifier. The entries of the filter are checked. If the entries are populated (e.g., having a value that differs from zero)—there are chances that the element is included in the dataset and a scan of all values can be performed. If at least one entry is not populated—it can be determined that the requested element definitely does not exist.

The clustering mechanism may be re-evaluated as the database gets populated, and the clustering mechanism may be adjusted so as to improve the balance of elements among clusters. In case it is decided to change the clustering mechanism, versioning of filters can be maintained. In addition to versioning the filters, a background process can be executed for transforming the old clustered fields to the new clusters, and to re-apply the new clusters to the new filter according to the new clustering mechanism.

FIG. 1 illustrates a dataset 100, which is a tabular dataset with L elements 101(1)-101(L), where each element includes two fields. For example, element 101(1) includes fields 101(1,1) and 101(1,2). The fields of each column may be grouped into groups of fields, such as N groups—out of which first and third groups 150(1) and 150(3) are shown, where the fields in each group may be fields that are stored consecutively, or fields stored in one file, one bucket, etc.

The values of all the fields are clustered into clusters (for example there are K clusters), such as first cluster 160(1) that represents multiple field's values. First cluster 160(1) may cluster fields from more than one group, as illustrated in FIG. 1.

For example—first group of fields 150(1) may include fields with values that belong to the first cluster 160(1), second cluster 160(2) and fifth cluster 160(5). The third group of fields 150(3) may include fields with values that belong to the first cluster 160(1), fifth cluster 160(5) and sixth cluster.

Each group may include fields having values that are clustered into multiple clusters, and first bloom filter 180(1) represents the results of the hash formulas that are applied on values of all the different clusters of first group 150(1).

FIG. 1 also illustrates N bloom filters 180(1)-180(N)—one for each group of fields.

FIG. 1 also illustrates value range to cluster value mapping data structure 185—for mapping a value range to a cluster value (also referred to as a cluster identifier).

Figure 2:
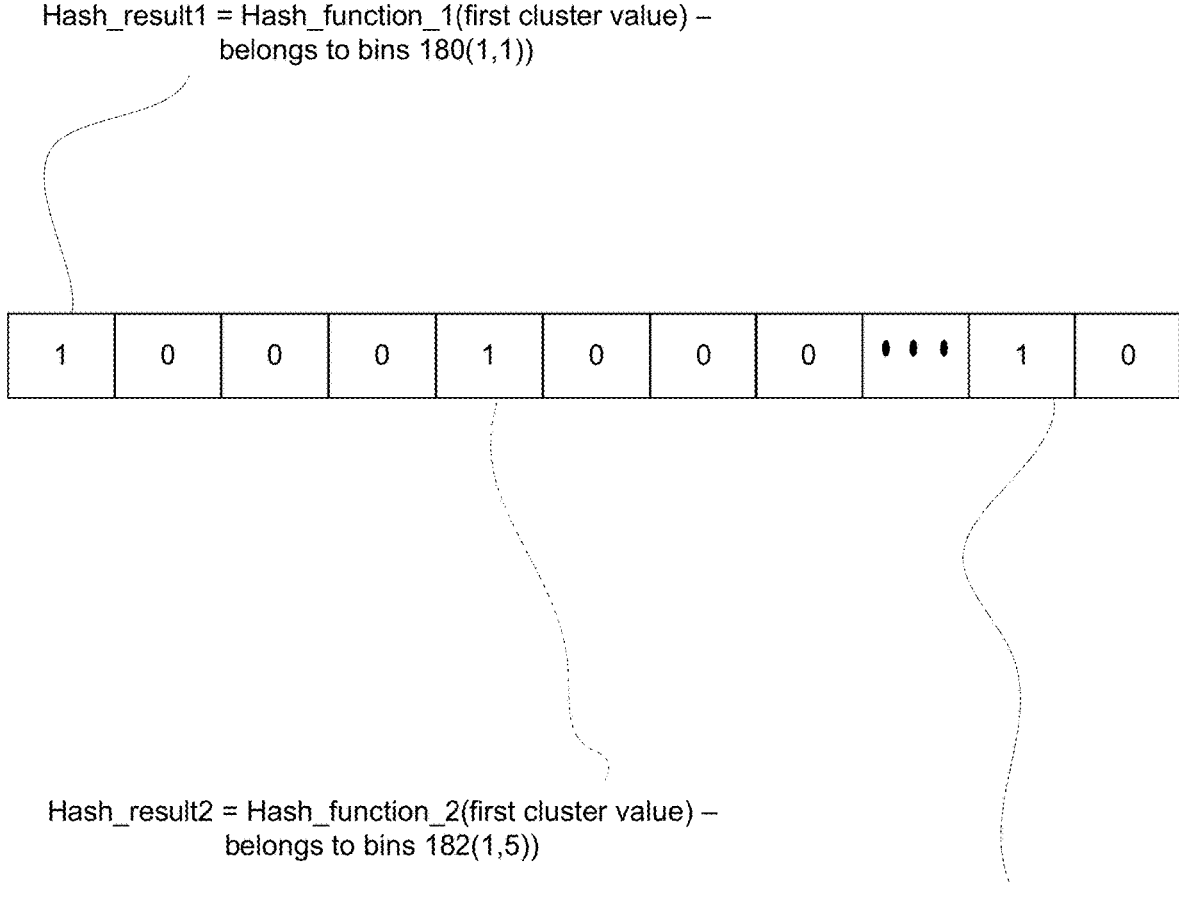
FIG. 2 illustrates an example of a group bloom filter.

FIG. 2 further illustrates a first bloom filter 180(1) that represents values of all the clusters of first group 150(1).

Assuming that there are three hash functions (Hash_function_1, Hash_function__2 and Hash_function_3) then the first bloom filter 180(1) is generated as follows:

Applying the first hash function, the second hash function and the third hash function on the first cluster value to generate a first hash result (Hash_result1), a second hash result (Hash_result2), and a third hash result (Hash_result3).

Determining, for each hash result, which bin (or bucket or bit) of the first Bloom filters is relevant (each bin includes a value that indicates whether a hash result of at least one cluster value provides the location of the bin within the array of the filter)).

Setting the bits (entries) of the relevant bins—for each one of the first, second and third hash results.

For example—in FIG. 2—the first bin is relevant to the first hash value and thus the first bit (180(1,1)) are set. The fifth bin is relevant to the second hash value and thus the fifth bit (180(1,5)) is set. The (n−1)'th bin is relevant to the third hash value and thus the (n−1)'th bit (180(1,n−1)) is set.

This is just an example—and the number of hash function may differ from three, and there may or may not be any overlap between sets bits of a bloom filter associated with two or more hash values.

It is advantageous to have a small number of clusters in each group, so that each filter represents a small number of clusters. For example, if it is decided that there will be a total of F clusters, then the optimal scenario is when in each group of G groups, the fields are clustered to F/G clusters, on average. In this scenario the group filter needs to support only F/G values. The worst scenario (in terms of efficiency of the filter) is when each group includes fields clustered into all the F clusters. Therefore, measures may be taken to assign new fields to their hosting groups, in a manner that minimizes the number of clusters in a group. The assignment to groups may corresponds to the clustering rules. For example, if the clustering is according to ranges of values, the assigning to groups may be also according to ranges of values in the groups, although the ranges of values of the groups may have a different resolution (e.g., rougher) than the resolution of ranges of the clusters. Optimization algorithms may be used for assigning fields to groups, based on at least the clustering rules.

Figure 3:
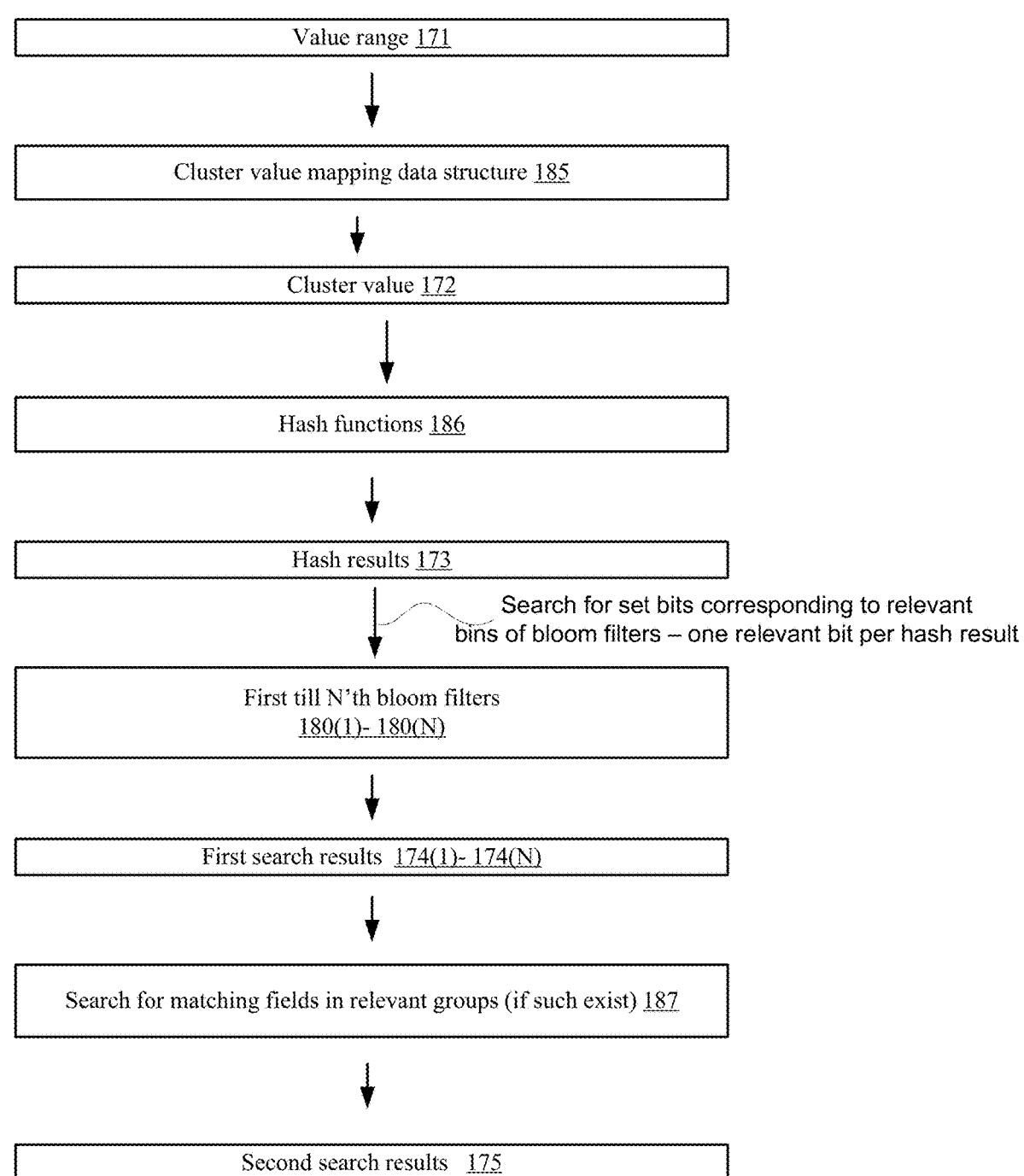
FIG. 3 illustrates an example of a method.

FIG. 3 illustrates an example of a method 170 for responding to a query related to a range value.

The method includes:

a. Receiving a value range 171.

b. Accessing a cluster value mapping data structure 185 to find the relevant cluster—and outputting a cluster value 172 of that relevant cluster.

c. Applying hash functions associated with the bloom filter of a certain set of fields (same hush functions used to add one or more values of the value range) 186 to provide hash results 173.

d. Accessing the first till N'th bloom filters 180(1)-180(N) and searching for the content of the relevant bins of the bloom filter (see for example FIG. 2)—one relevant bin per hash result—and providing first search results 174(1)-174(N). Each first search result is related to a unique group of fields and indicate whether the cluster value can be "possibly in the group of fields" (positive first search result) or "definitely not in the group of fields" (negative first search result).

e. Searching matching fields in relevant groups (if such exist) 187. The search is conducted in each group of fields associated with a positive first search result and may be avoided in each group of fields associated with a negative first search result.

FIG. 4 illustrates an example of a method 600 for cluster based searching for a value range stored in a storage system.

Method 610 may start by step 610 of receiving a request to find a certain value range within a set of information elements that are stored in a storage system.

The set of information elements includes subsets of information elements associated with subset hash-based filters.

A subset hash-based filter is a hash-based filter associated with a subset. Different subsets of information elements are associated with different subset hash-based filters.

Step 610 may be followed by step 620 of determining a certain cluster value of a certain cluster that comprises the certain value range.

Step 620 may be followed by step 630 of applying multiple hush functions on the certain cluster value to provide multiple hash results.

Step 630 may be followed by step 640 of determining whether one or more members of the certain cluster are possibly in a subset. Such a subset (that may include one or more members) is termed a potentially relevant subset of information elements (PRSIE). The potentially relevant may include the one or members. On the other hand—a subset of information elements that definitely (according to the hash based filter) does not include any member—is an irrelevant subset of information elements.

It should be noted that the determining may find more that a single PRSIE— but for simplicity of explanation we will assume that a single PRESIE was found.

The members of the cluster includes multiple values and/or value ranges, that may include the certain value range, and other values that are not part of the request to find the certain value range.

Step 640 may include definitely determining that the subset does not include any member of the certain cluster.

Step 640 may include detecting a subset associated subset hash based filter that indicates that the any member of the certain cluster is definitely not within the subset.

If determining that one or more members of the certain cluster are possibly in the PRSIE—step 640 may be followed by step 650 of searching, within PRSIE, a matching information element that matches the certain value range.

If determining that one or more members of the certain cluster are definitely not in the subset—step 640 may be followed by step 660.

Step 650 may be followed by step 660 of providing a response to the request. This may include providing a not found indication, providing a found indication or any information related to a relationship between the certain value range and content stored in the storage system.

Step 660 may include sending a not found response without searching the certain value range in the subset.

Step 660 may include responding to the query by sending information regarding the matching information element.

Method 600 may include preventing from searching a matching information element within the subset of information elements.

Each subset of information elements may include information elements that belong to less than a predefined number of clusters. By limiting the number of cluster per group—the collision probability per size of the bloom filter is reduced.

The clusters may be (for example—after a data base is populated) so that they include enough (what amount to enough can be determined in any manner)—for example an average number of member per cluster may exceed a predefined threshold.

There may be provide a storage system that may include one or more controllers capable of controlling the execution of any one of methods 170 and 600.

The controller may be of any type of hardware and/or programmed controller, for example—it may be, may include or may be included in one or more compute node of a storage system.

Figure 5:
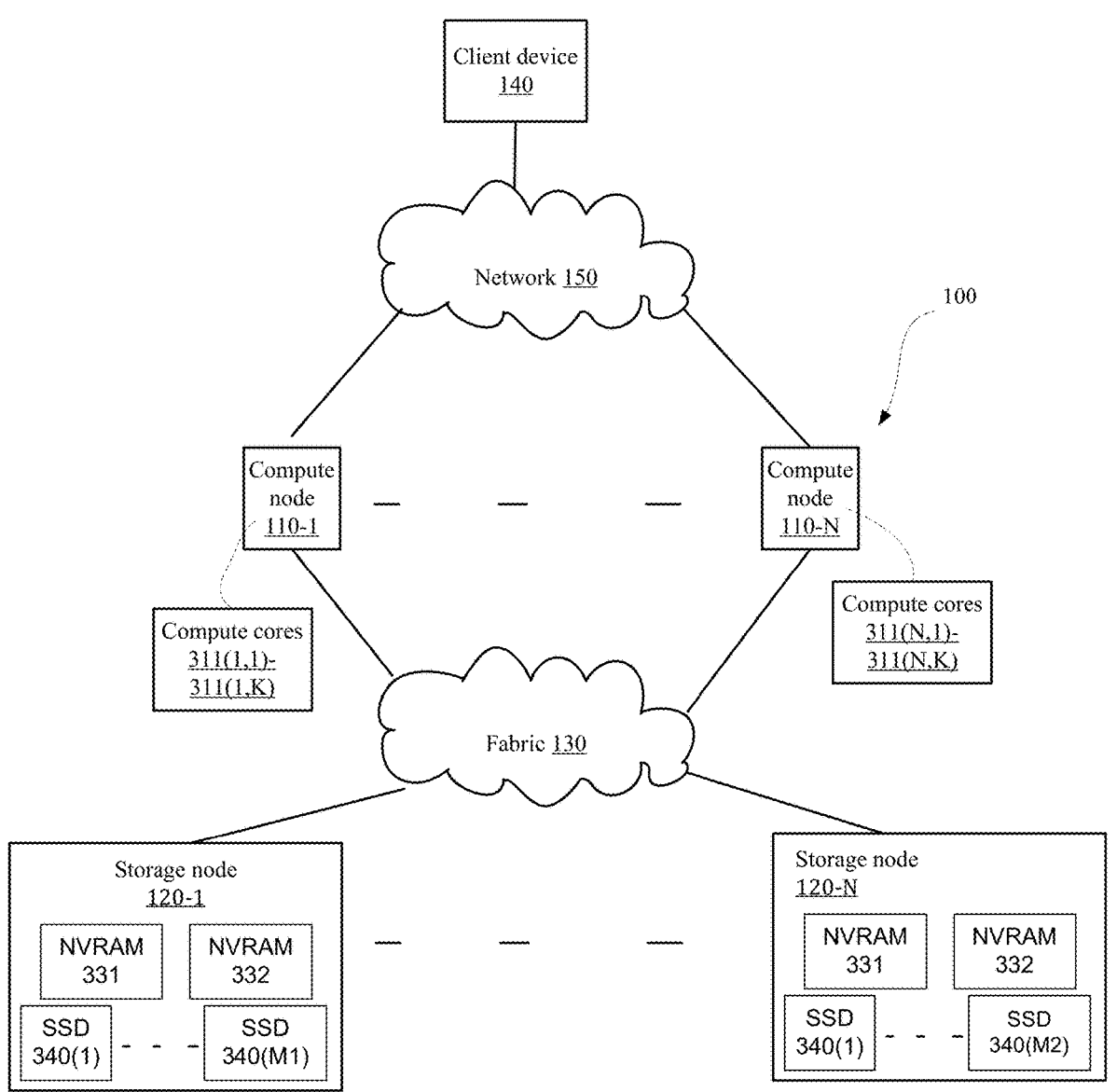

FIG. 5 shows an example diagram of a storage system 100 according to the disclosed embodiments.

The storage system 100 includes a number of N compute nodes 110-1 through 110-N (hereinafter referred to individually as a compute node 110 and collectively as compute nodes 110, merely for simplicity purposes, N is an integer equal to or greater than 1). The compute nodes include (or may execute) multiple compute cores each—see for example compute nodes 311(1,1)-311(1,K) and compute nodes 311(N,1)-311(N,K).

The storage system 100 also includes a number of M storage nodes storage node 120-1 through 120-M (hereinafter referred to individually as a storage node 120 and collectively as storage nodes 120, merely for simplicity purposes, M is an integer equal to or greater than 1).

The computer nodes 110 and the storage nodes 120 are connected through a communication fabric 130. M may equal N or may differ from N.

In an embodiment, a compute node 110 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 110 does not require any dedicated hardware. An example arrangement of a compute node 110 is provided in FIG. 3D.

A compute node 110 is configured to perform tasks related to the management of the storage nodes 120. In an embodiment, each compute node 110 interfaces with a client device 140 (or an application installed therein) via a network 150. To this end, a compute node 110 is configured to receive requests (e.g., read or write requests) and promptly serve these requests in a persistent manner. The network 150 may be, but is not limited to, the Internet, the world-wide-web (WWW), a local area network (LAN), a wide area network (WAN), and the like.

In an embodiment, a compute node 110 is configured to interface with different protocols implemented by the client devices or applications (e.g., TCP/IP, HTTP, FTP, etc.) and to manage the read and write operations to the storage nodes 120. The compute node 110 is further configured to translate the protocol commands into a unified structure (or language). Then, each compute node 110 is also configured to logically address and map all elements stored in the storage nodes 120.

Further, each compute node 110 may maintain the logical operations of elements and the relationships between the elements (for example, directory trees) and an element attribute (e.g., metadata) via state stored on the storage nodes 120. An element may include a file, a directory, an object, and the like. The mapping and addressing of the elements allow the compute node 110 to maintain the exact physical locations of the elements in the storage nodes 120.

In an embodiment, to efficiently read and write data to the storage nodes 120 from the physical layer, each compute node 110 performs a number of processes including data reduction, data resiliency, and Flash memory management actions (e.g., defrag, wear leveling, and so on).

It should be noted that each compute node 110 may operate in the same manner as all other compute nodes 110. In a case of a failure, any compute node 110 can replace the failed node. Further, each compute node may control and manage one or mode storage nodes 120 regardless of the specific architecture of the storage nodes 120. Therefore, there is no coupling between specific compute nodes 110 and specific storage nodes 120. As such, compute nodes can be added to the system 100 without increasing the number of storage nodes (or their capacity), and vice versa, storage nodes can be added without increasing the number of compute nodes 110.

The storage nodes 120 provide the storage and state in the system 100. To this end, each storage node 120 may include a plurality of SSDs which may be relatively inexpensive.

The storage nodes 120 may be configured to have the same capacity as each other or different capacities from each other. In an embodiment, the data stored in each storage node 120 is made redundant internally within the storage node, made redundant at a different storage node, or both. Each storage node 120 further includes a non-volatile random-access memory (NVRAM) such as NVRAM 331 and 332 and an interface module for interfacing with the compute nodes 110.

A storage node 120 may be configured to communicate with the compute nodes 110 over the communication fabric 130. It should be noted that each compute node 110 can communicate with each storage node 120 over the communication fabric 130. There may not be a direct coupling between a compute node 110 and storage node 120.

In the embodiment, the communication fabric 130 may include an Ethernet fabric, an InfiniBand fabric, and the like. Specifically, the communication fabric 130 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 140 is part of a computer node 110. In such a deployment, the system 100 does not communicate with an external network, e.g., the network 150. It should be further noted that the communication between the compute nodes 110 and the storage nodes 120 is always facilitated over the fabric 130. It should be further noted that the compute nodes 120 can communicate with each other over the fabric 130. The fabric 130 is a shared fabric.

According to the disclosed embodiments, the NVRAM is utilized to reduce the number of write accesses to the SSDs and the write amplification. According to an embodiment, data is written first to the NVRAM, which returns an acknowledgement after each such data write. Then, during a background migration process, the data is transferred from the NVRAM to the SSDs. The data may kept in the NVRAM until the data is completely written to the SSDs 210. Furthermore, this writing procedure ensures no data is lost when power is off.

FIG. 5 also illustrates a controller 997, a load monitor 998 and a load balancer 999. The load balancer 999 and the load monitor 998 may be included in one of the compute nodes, may be located outside any of the compute nodes, may be combined, may include one or more compute cores, may be executed by one or more compute cores, and the like. There may be more than a single load balancer and a single load monitor. The controller 997 may control the execution of any of the methods illustrated in the application.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for cluster based searching for a value range stored in a storage system, the method comprising:

receiving a request to find information elements having values within a certain value range, wherein the information elements to be found are included in a set of information elements that are stored in a storage system;

11 wherein the set of information elements comprises subsets of information elements, wherein each subset is associated with a subset hash based filter;

wherein values of the information elements of the set are clustered using a clustering mechanism into multiple clusters, and wherein each cluster is assigned with a cluster value and represents different members having different values that belong to the cluster;

wherein at least one subset includes information elements having values that are clustered into different clusters, and wherein at least one cluster includes at least one member that matches values of information elements from multiple subsets;

determining a certain cluster value of a certain cluster of the multiple clusters that comprises a member within the certain value range;

applying one or more hush functions on the certain cluster value to provide one or more hash results; and determining whether one or more members of the certain cluster are possibly in a subset of information elements, based on applying the one or more hash results on a subset hash based filter of the subset of information elements; and when determining that the one or more members of the certain cluster are possibly in the subset then searching, within the subset, a matching information element that matches the certain value range; and adjusting the clustering mechanism to improve a balance of information elements among the multiple clusters while maintaining versions of subset hash based filters of the subsets of information elements;

wherein the adjusting of the clustering mechanism is followed by transforming, using a background process, fields that were clustered by the clustering mechanism before being adjusted to fields of newly generated clusters generated by the clustering mechanism following the adjusting.

2. The method according to claim 1 wherein the determining comprises definitely determining that the subset of information elements does not include any member of the certain cluster.

3. The method according to claim 2 comprising sending a not found response without searching the matching information element in the subset of information elements.

4. The method according to claim 3 comprising preventing from searching a matching information element within the subset of information elements.

5. The method according to claim 1 wherein a given cluster value of a given cluster is a concatenation of values that belong to information elements of the given cluster.

6. The method according to claim 1 wherein a given cluster value of a given cluster is not related to values of fields of information elements that belong to the given cluster.

7. The method according to claim 1 wherein the certain value range is a single value.

8. A non-transitory computer readable medium for cluster based searching for a value range stored in a storage system, the non-transitory computer readable medium stores instructions for:

Receiving a request to find information elements having values within a certain value range, wherein the information elements to be found are included in a set of information elements that are stored in a storage system; wherein the set of information elements comprises subsets of information elements, wherein each subset is associated with a subset hash based filter;

Wherein values of the information elements of the set are clustered using a clustering mechanism into multiple clusters, and wherein each cluster is assigned with a cluster value and represents different members having different values that belong to the cluster;

Wherein at least one subset includes information elements having values that are clustered into different clusters, and wherein at least one cluster includes at least one member that matches values of information elements from multiple subsets;

Determining a certain cluster value for a certain cluster of the multiple clusters that comprises a member within the certain value range;

Applying one or more hash functions on the certain cluster value to provide one or more hash results;

Determining whether one or more members of the certain cluster are possibly in a subset of information elements, based on applying the one ore more hash results on a subset hash based filter of the subset of information elements;

When determining that the one or more members of the certain cluster are possibly in the subset then searching, within the subset, a matching information element that matches the certain value range; and Adjusting the clustering mechanism to improve a balance of information elements among the multiple clusters while maintaining versions of subset hash based filters of the subsets of information elements;

wherein the adjusting of the clustering mechanism is followed by transforming, using a background process, fields that were clustered by the clustering mechanism before being adjusted to fields of newly generated clusters generated by the clustering mechanism following the adjusting.

9. The non-transitory computer readable medium according to claim 8 wherein the determining comprises definitely determining that the subset of information elements does not include any member of the certain cluster.

10. The non-transitory computer readable medium according to claim 9 that stores instructions for sending a not found response without searching the matching information element in the subset of information elements.

11. The non-transitory computer readable medium according to claim 10 that stores instructions for preventing from searching a matching information element within the subset of information elements.

12. The non-transitory computer readable medium according to claim 8 wherein a given cluster value of a given cluster is a concatenation of values that belong to information elements of the given cluster.

13. The non-transitory computer readable medium according to claim 8 wherein an average number of members per cluster exceeds a predefined threshold.

14. The non-transitory computer readable medium according to claim 8 wherein a given cluster value of a given cluster is not related to values of fields of information elements that belong to the given cluster.

15. A storage system that comprises at least one controller that is configured to:

receive a request to find information elements having values within a certain value range, wherein the information elements to be found are included in a set of information elements that are stored in a storage system;

wherein the set of information elements comprises subsets of information elements, wherein each subset is associated with a subset hash based filter;

wherein values of the information elements of the set are clustered using a clustering mechanism into multiple clusters, and wherein each cluster is assigned with a cluster value and represents different members having different values that belong to the cluster;

wherein at least one subset includes information elements having values that are clustered into different clusters, and wherein at least one cluster includes at least one member that matches values of information elements from multiple subsets;

determine a certain cluster value of a certain cluster of the multiple clusters that comprises a member within the certain value range;

apply one or more hush functions on the certain cluster value to provide one or more hash results; and determine whether one or more members of the certain cluster are possibly in a subset of information elements, based on applying the one or more hash results on a subset hash based filter of the subset of information elements; and when determining that the one or more members of the certain cluster are possibly in the subset then searching, within the subset, a matching information element that matches the certain value range; and adjusting the clustering mechanism to improve a balance of information elements among the multiple clusters while maintaining versions of subset hash based filters of the subsets of information elements;

wherein the adjusting of the clustering mechanism is followed by transforming, using a background process, fields that were clustered by the clustering mechanism before being adjusted to fields of newly generated clusters generated by the clustering mechanism following the adjusting.

16. The storage system according to claim 15 wherein a given cluster value of a given cluster is a concatenation of values that belong to information elements of the given cluster.

17. The storage system according to claim 16 wherein the controller is configured to sending a not found response without searching the matching information element in the subset of information elements.

18. The storage system according to claim 17 wherein the controller is configured to prevent from searching a matching information element within the subset of information elements.

* * * * *